May 9, 1950 C. G. JOHNSON 2,506,926
AUTOMATIC PHONOGRAPH
Filed Nov. 8, 1946 6 Sheets-Sheet 1

INVENTOR
Carl G. Johnson
John F. Eakins
ATTORNEY

May 9, 1950     C. G. JOHNSON     2,506,926
AUTOMATIC PHONOGRAPH
Filed Nov. 8, 1946     6 Sheets-Sheet 2

INVENTOR
Carl G. Johnson
John F. Eakins
ATTORNEY

May 9, 1950            C. G. JOHNSON            2,506,926

AUTOMATIC PHONOGRAPH

Filed Nov. 8, 1946                                   6 Sheets-Sheet 3

INVENTOR
Carl G. Johnson
John F. Eakins
ATTORNEY

May 9, 1950   C. G. JOHNSON   2,506,926
AUTOMATIC PHONOGRAPH
Filed Nov. 8, 1946   6 Sheets-Sheet 5

INVENTOR
Carl G. Johnson
John F. Eakins
ATTORNEY

May 9, 1950

C. G. JOHNSON 2,506,926

AUTOMATIC PHONOGRAPH

Filed Nov. 8, 1946

INVENTOR.
Carl G. Johnson
John F. Eakins
ATTORNEY

Patented May 9, 1950

2,506,926

UNITED STATES PATENT OFFICE 2,506,926

AUTOMATIC PHONOGRAPH

Carl G. Johnson, Chicago, Ill., assignor to J. P. Seeburg Corporation, Chicago, Ill., a corporation of Illinois Application November 8, 1946, Serial No. 708,480

17 Claims. (Cl. 274—10)

This invention relates to automatic phonographs and has for its principal object the provision of a compact phonograph which is capable of reproducing both sides of each of a stack of records.

The invention will readily be understood by the following description of a preferred embodiment thereof taken in conjunction with the accompanying drawings in which.

Referring to the drawings, the phonograph comprises a base plate 30, a turntable 31, a player arm 32, a pair of record dropping escapement heads 33, an auxiliary turntable 34, a supporting arm 35 for the auxiliary turntable and other co-related mechanisms which will hereinafter be described.

Figures 4, 5, 9:
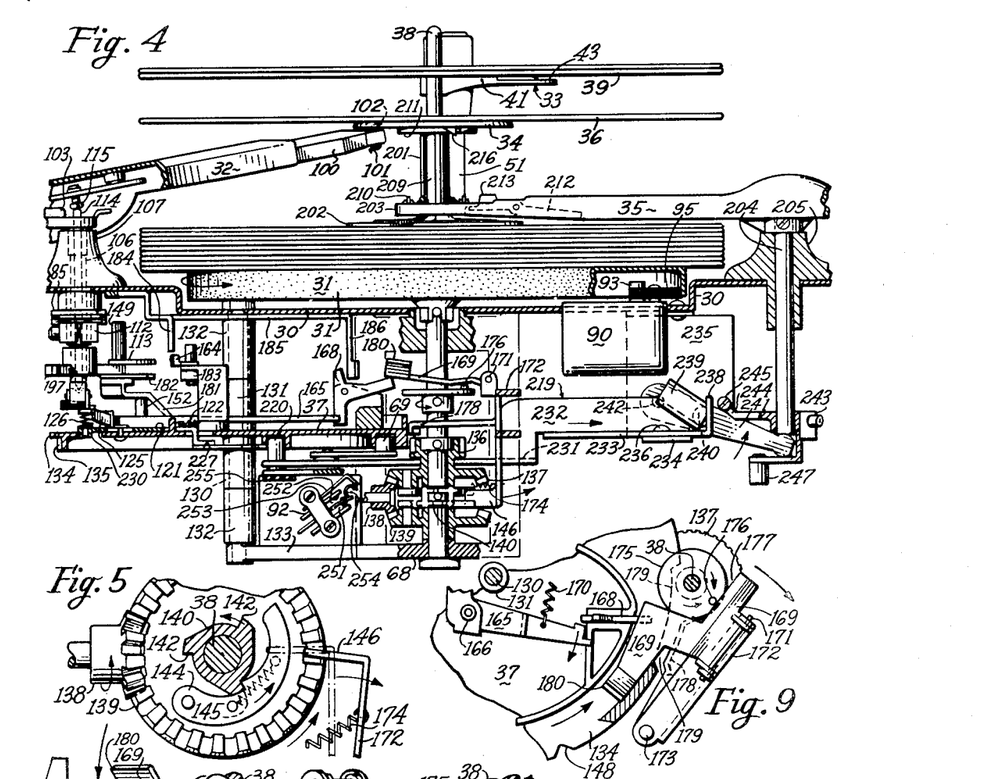
Fig. 4 is a sectional elevation through the machine on the line 4—4 of Fig. 1.
Fig. 5 is a sectional detail plan view taken on the line 5—5 of Fig. 6 showing the lower clutch and gear of the drive elements of the main cam gear.
Fig. 9 is a fragmentary plan view showing elements which are actuated to initiate the drive of the main cam gear.

In order to facilitate understanding of the invention I now give a brief description of its general manner of operation. Referring particularly to Fig. 4, the player arm 32 is engaging the underside of a record 36 which is supported on the small auxiliary turntable 34 with the recorded surface of the record exposed. At the end of the playing of the record the player arm 32 trips the mechanism in a manner hereinafter to be described with the result that a cam gear 37 is put into rotation to make one revolution. This revolution effects lowering of the player arm 32 from the record 36, movement of the player arm 32 outwardly clear of the records, elevation of the arm 35 to lift the auxiliary turntable 34 away from the turntable or the records on the turntable on which it may be resting and the lateral displacement of the arm 35 and the auxiliary turntable 34 so that the record 36 which was resting on the auxiliary turntable 34 drops down a spindle 38 onto the turntable or the records which may have previously been dropped onto the turntable.

During the playing of the underside of the record 36 the turntable 31 and the auxiliary turntable 34 were driven in the counterclockwise direction as viewed from above for proper reproduction of the recording groove by the player arm 32. When the arm 35 moves outwardly to drop the record 36 the direction of rotation of the turntable 31 is reversed so that the player arm 32 may reproduce the recording on the upper side of the dropped record. After the record is dropped the player arm 32 moves inwardly to initial playing position and then downwardly to coperate with the upper surface of the record 36 which now rests on the turntable 31 or on the stack of record built up on that turntable. During this revolution of the cam gear 37 the escapement heads 33 are not actuated.

After the upper surface of the record 36 has been reproduced the tone arm trips the mechanism so that the cam gear 37 is brought into operation to make a complete revolution. This complete revolution raises the player arm 32, moves it laterally outwardly clear of the records, carries the arm 35 inwardly to bring the auxiliary turntable 34 into co-axial relation with the spindle 38, moves the arm 35 downwardly to disengage it from the auxiliary turntable 34, actuates the escapement heads 33 so that the lowermost of the stack of records 39 supported by the escapement heads drops downwardly onto the auxiliary turntable 34, moves the player arm 32 inwardly to initial playing position and then moves the player arm upwardly to engage the underside of the newly dropped record which is now in the position of the record 36 shown in Fig. 4. Before the player arm 32 engages the newly dropped record the direction of rotation of the turntable is reversed.

Figure 1:
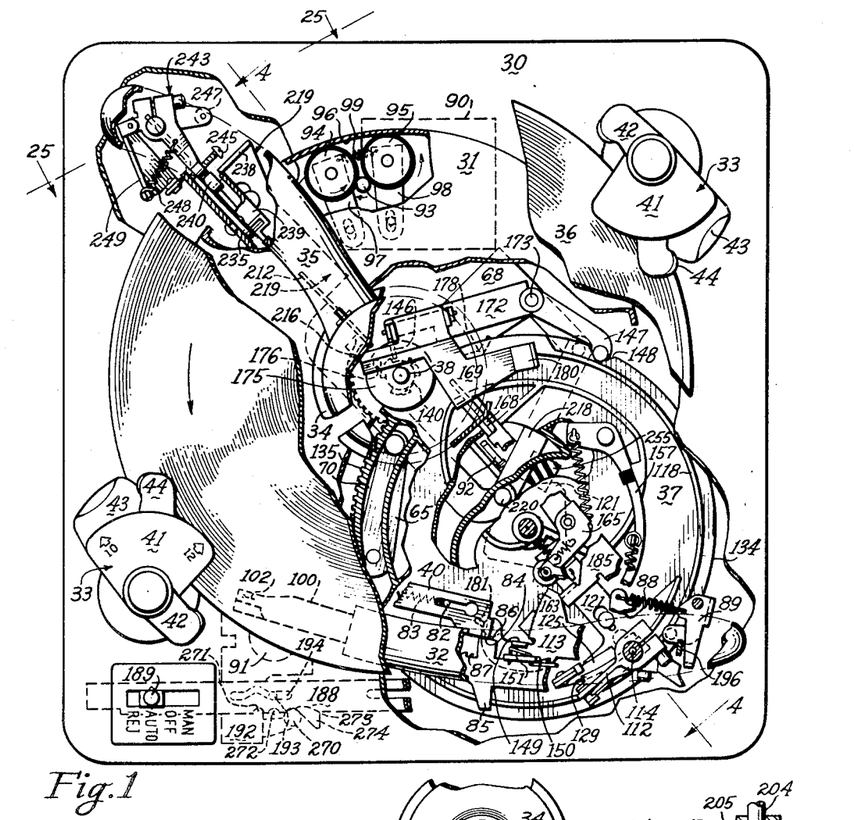
Figure 1 is a plan view of my improved phonograph, parts thereof being broken away, the better to illustrate the mechanism, the mechanism being in the condition for the playing of the underside of a record.

The present machine comprises features which are described in my co-pending application Serial No. 585,901 filed March 31, 1945, now Patent No. 2,484,570, issued October 11, 1949. The escapement heads 33 are substantially the same as the corresponding heads of that application and the drive of the heads is effected in the same manner with the exception that modifications are made in the cam gear 37 to insure actuation of the heads only on each alternate complete revolution of the cam gear. As in the previous application the escapement heads 33 can be adjusted into position for playing a stack of 12 inch records or a stack of 10 inch records and into a third position where the escapement heads are clear of the records so that a played stack may be removed from the turntable by merely lifting it up. As in the application referred to the position of adjustment of the heads 33 for 10 or 12 inch records determines the position of a member 40 which controls initial playing position of the tone arm so that the initial playing position is appropriate for the size of records for which the heads 33 are set. When the heads 33 are set for 12 inch records, as shown in Fig. 1, a stack of 12 inch records may be applied to the escapement heads with the spindle 38 extending through their central openings, so that the stack of records rests on the surfaces 41. When the heads are oscillated in the counterclockwise direction as viewed in Fig. 1, blades 42 carried by the escapement heads enter the stack above the lowermost record and thereafter the surfaces 41 clear the underside of the lowermost record so that the lowermost record drops down along the spindle onto the auxiliary turntable 34. The return movement of the oscillation withdraws the blades 42 from the remaining stack of records so that the stack drops down onto the surfaces 41 which are again presented to receive it.

When the heads 33 are adjusted for cooperation with a 10 inch stack they are rotated approximately 90° in the clockwise direction as viewed from above from their position in Fig. 1 so that the indicia "10" on one of the escapements is directed towards the spindle 38. A stack of 10 inch records applied to the escapements rests upon surfaces 43 and the escapements 33 and when the same oscillation is applied to the escapement heads the blade 44 enters the stack above the lowermost record and the surfaces 43 are withdrawn from below the lowermost record so that the lowermost record is allowed to drop onto the auxiliary turntable 34.

Figure 25:
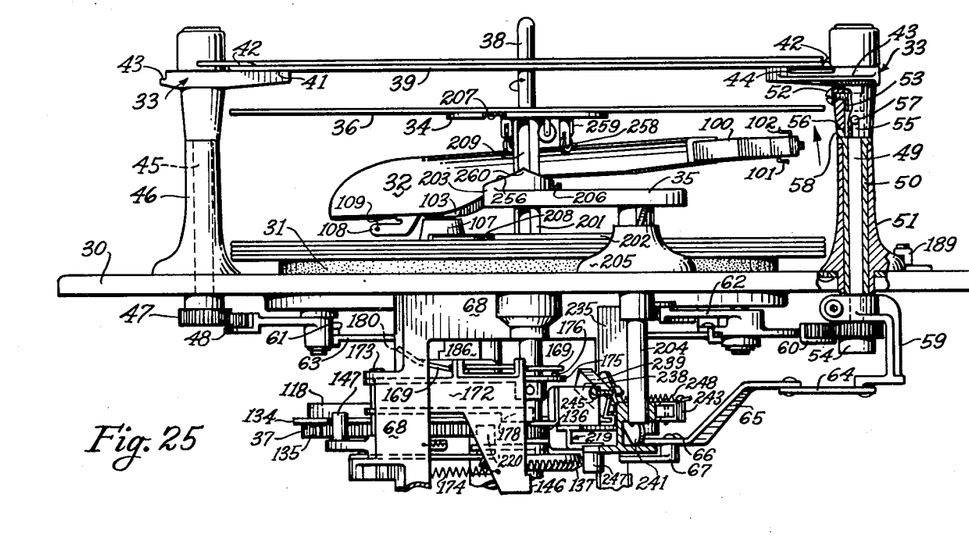
Fig. 25 is an elevational view of the machine showing the auxiliary turntable supporting a record and the player arm about to engage the underside of that record.

One of the escapement heads 33, the left hand one shown in Fig. 25, is carried by a spindle 45 which is rotatably mounted in a standard 46 carried by the base plate 30. At its lower end the spindle 45 carries a pinion 47 which meshes with a sector 48 pivotally mounted on the underside of the base plate.

Figure 10:
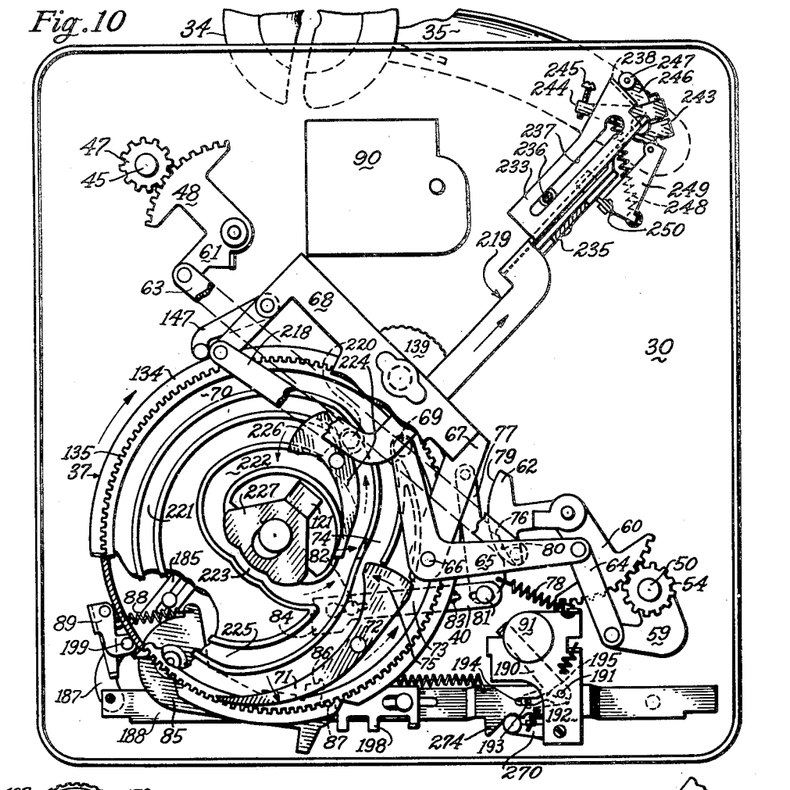
Fig. 10 is an inverted plan view of the phonograph, parts thereof being broken away the better to disclose the mechanism, which is shown in an intermediate position of a cycle of the main cam gear immediately before the playing of the topside of a record on the main turntable.

The other head 33, that is the right hand head shown in Fig. 25, is mounted for limited sliding movement on a shaft 49 which is rotatably mounted in a rotatable sleeve 50 carried by a standard 51 also mounted on the base plate 30. A screw 52 carried by the head extends into a cylindrical recess 53 on the shaft 49 to limit the vertical movement of the head. At its lower end the shaft 49 rigidly carries a pinion 54. The lower end of the mounting sleeve of this head is provided with a relatively long vertical slot 55 and a relatively small slot 56. A pin 57 carried by the shaft 49 extends into the long slot 55, the arrangement being such that the pin 55 is always located in the slot 55 so that the head cannot be rotated independently of the shaft 49. When the machine is set for 10 inch records the slot 55 engages a projection 58 carried at the upper end of the sleeve 50. When the projection 58 is engaged by the small slot 56 the heads are in the 12 inch position. At its lower end the sleeve 50 rigidly carries an actuating arm 59 which effects oscillation of the heads 33. The pinion 54 meshes with a sector 60 pivotally mounted on the underside of the base plate 30. The sector 48 is integral with the arm 61 and the sector 60 is integral with an arm 62. The arms 61 and 62 are connected by a link 63 so that the two heads always move simultaneously. It will readily be apparent that after the right hand escapement head 33 in Fig. 25 is elevated the escapement heads are disconnected from the sleeve 50 and the actuating arm 59, the escapement heads may be located in any of their three positions by suitable actuation of the right hand escapement head. The actuating arm 59 is connected by a link 64 to a bell-crank lever 65 which is pivotally mounted at 66 on a bracket 67 which is carried by a housing 68 mounted on the underside of the base plate 30. The bell-crank lever carries an upwardly projecting cam follower 69 which cooperates with a cam track 70 provided in the undersurface of the cam gear 37. To provide for non-actuation and actuation of the heads 33 alternately during successive complete revolutions of the cam gear 37 I provide on the cam 37 a gate 71 which is pivotally mounted on the cam gear at 72. This gate diverts the cam follower 69 into a path 73 or 74. In Fig. 10 I have shown the cam gear rotated approximately 165° from its normal position during a revolution in which the escapements 33 are not actuated. At the beginning of this revolution the gate 71 was positioned so as to divert the cam follower 69 into the path 73. The gate 71 is provided with a butt 75 which was located in the path 73. As the gate 71 was carried past the cam follower 69 with the cam follower on the outer side of the gate the cam follower engaged the butt 75 and swung the gate 71 into the position in which it is shown in Fig. 10. The cam track 70 and the path 73 constitute a circle so that the bell-crank lever 65 remains stationary during this revolution. The cam gear 37 terminates its movement after it has moved another 195° in the clockwise direction from its position in Fig. 10 and the gate 71 remains in its position of Fig. 10 relative to the cam gear 37 until the record brought into play by the movement of the cam gear 37 has been completed. During the next revolution of the cam gear 37 the gate 71 diverts the cam follower 69 into the path 74 which effects oscillation of the bell-crank lever 65 and the escapement heads 33 to drop a record onto the auxiliary turntable 34. During this second revolution of the cam gear 37 the cam follower 69 engages the butt 75 of the gate 71 so that the gate again displaces the gate 71 and conditions the cam track 70 for the next revolution of the cam gear during which the bell-crank lever 65 and the escapements are not actuated.

The arm 62 is provided with a cam surface 76 which is adapted to cooperate with a similar surface on a lever 77 pivotally mounted on the underside of the base plate 30. The lever 77 is biased towards the arm 62 by means of a relatively strong spring 78. When the escapements are located in their 12 inch position the lever 77 is positioned as shown in Fig. 10, engaging the high surface 79 on the arm 62. When the escapements are in the 10 inch position the lever 77 engages the low surface 80 of the arm 62 so that it is displaced more to the right than its position in Fig. 10. The lever 77 carries a depending stud 81 which engages and partially supports the member 40 extending through a slot in the right hand extremity of this member as viewed in Fig. 10. The member 40 is also supported by means of a stud 82 depending from the base plate and extending through a slot in the member 40. The member 40 is biased towards the left as viewed in Fig. 10 by means of a spring 83 connected to the member 40 and to the stud 82 so that the member 40 tends to maintain the outer end of its right hand slot in engagement with the stud 81. At its inner end the member 40 carries a downturned abutment 84 which is adapted to cooperate with a lever 85 which effects return of the player arm to initial playing position. When the machine is set for 12 inch records the abutment 84 is engaged by the surface 86 of the lever 85 and when the machine is set for 10 inch records the abutment 84 engages a surface 87 on the lever. The lever 85 is biased inwardly by means of a strong spring 88 connected to the lever and to a player arm latch member 89. The connection of the spring 88 to the latch member 89 provides very slight leverage.

The machine is driven by means of a reversible motor 90 which is controlled by a manually operated switch 91 and an automatic reversing switch 92. The motor 90 is mounted on the base plate 30 and it is provided with a driving pulley 93 which engages two rubber tired idlers 94 and 95 which engage the depending flange 96 of the turntable. The idlers 94 and 95 are rotatably carried by arms 97 and 98 which are connected to the motor by studs and slots. Arms 97 and 98 are biased together by means of a spring 99 which holds the idlers in engagement with the rim of the turntable and with the driving pinion 93 of the motor. When the turntable is being driven in the clockwise direction the driving pinion 93 is driven in the opposite direction so that the idler 95 is maintained in firm contact with the rim of the turntable by wedging action. This rotation of the driving pinion tends to move the pinion 94 away from the rim of the turntable so that the idler 94 is in effect inoperative. When the driving pinion rotates in the clockwise direction the idler 94 is brought into operation to rotate the turntable in the opposite direction, that is the counterclockwise direction and the idler 95 is inoperative.

Figures 13, 14, 15, 16:
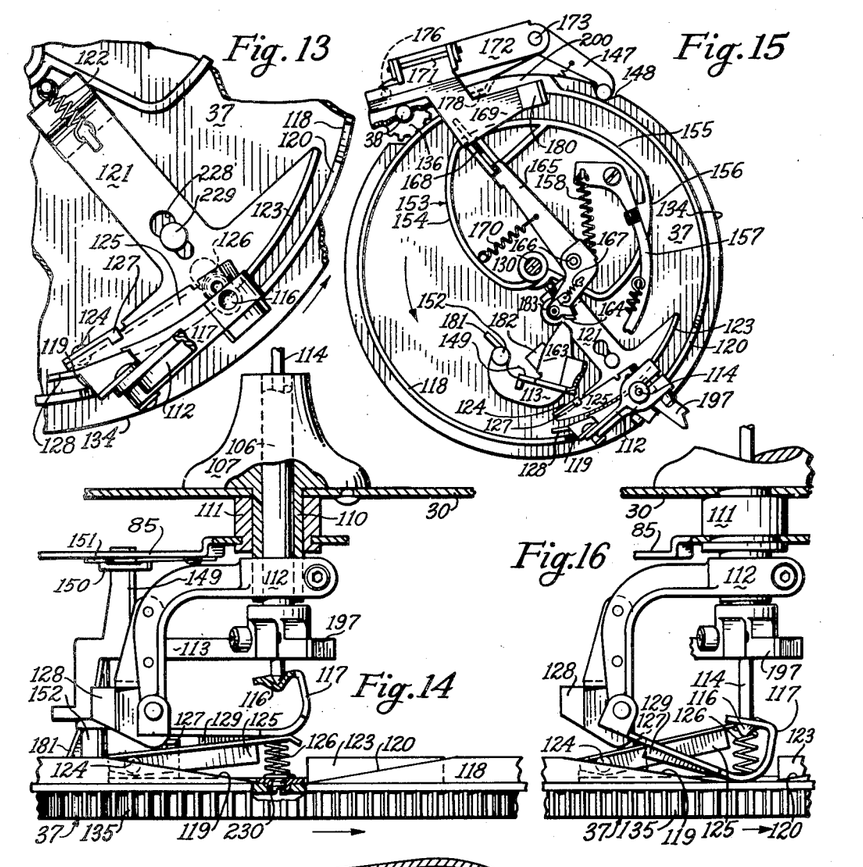
Fig. 13 is a sectional fragmentary plan view of part of the main cam gear and mechanism associated therewith for actuating the player arm for cooperation with the underside of a record.
Fig. 14 is a sectional elevation showing the mechanism of Fig. 13 and associated mechanisms.
Fig. 15 is a top plan view of the cam gear showing the mechanism of Fig. 13 conditioning the player arm for cooperation with the topside of a record on the main turntable, this figure being on a smaller scale than that employed in Figs. 13 and 14.
Fig. 16 is a fragmentary sectional elevation showing the mechanism for actuating the player arm in condition corresponding to Fig. 15, Fig. 16 being on the larger scale employed for Figs. 13 and 14.
Figure 17:
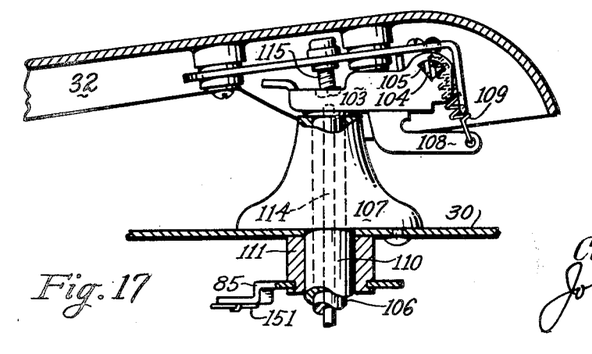
Fig. 17 is a sectional elevational view showing the mounting of the player arm in condition corresponding to Figs. 15 and 16.

The player arm 32 is provided with a pickup 100 which has a record engaging needle 101 projecting downwardly to play a record on the turntable 31 and an upwardly projecting needle 102 to play the underside of a record supported on the auxiliary turntable 34. The player arm 32 is pivotally mounted on a frame 103 by means of knife edges 104 which extend into V-shaped openings 105 in upstanding sides of the frame 103. The frame 103 is rigidly carried by a sleeve 106 which is rotatably mounted in a standard 107 mounted on the base plate 30. The tail 108 on the frame 103 provides a mounting for a spring 109 which is connected to the player arm so as to counterbalance to a considerable extent the weight of the player arm and provide the proper needle pressure for the needle on the record on the turntable. The standard 107 includes a tubular extension 110 which projects downwardly below the base plate 30. The standard is rigidly mounted in position by means of a collar 111 secured to the tubular extension 110. The collar 111 provides pivotal support for the lever 85. A stationary bracket 112 is rigidly mounted on the tubular extension 110 of the standard 107. Rigidly mounted on the lower end of the sleeve 106 below the tubular extension 110 is an arm 113 which controls the lateral movements of the player arm. The vertical movements of the player arm are controlled by a rod 114 which extends through the sleeve 106. Its upper end is arranged to engage adjustable abutment 115 carried by the player arm 32 at a point displaced from the pivot 104, 105. The lower end of the rod 114 seats in a depression 116 in a lever 117 pivotally mounted on the bracket 112. The lever 117 is arranged to ride upon a cam 118 mounted on the upper side of the cam gear 37. When the upper side of a record on the turntable 31 is to be played the lever 117 engages a low spot on the cam 118 (as best seen in Fig. 16) when the cam gear 37 is in its normal position of rest, as it always is during the playing of a record. In this case the rod 114 is in its lowermost position so that the player arm is permitted to drop onto the record on the turntable 31. At the end of the playing of the record the cam gear 37 goes into operation and the rise 119 of the cam 118 moves the lever 117 upwardly so that the rod 114 is displaced upwardly to a limited extent, lifting the needle out of engagement with the record which has been played. It is to be noted that the lift applied to the player arm by the cam rise 119 is sufficient to raise the player arm out of engagement of the topmost record of a stack of records which has built up on the turntable 31 so that the outwardly laterally movement of the player arm is effected when the needle is clear of the stack of records on the turntable. It is also to be noted that when a record is to be played on the turntable, the player arm is moved inwardly at an elevated position since the lever 117 is riding on the top of the cam 118. During the final movement of the cam gear 37 into its normal arrested position the lever 117 rides down the cam fall 120 of the cam 118 so that the player arm descends into engagement with the record on the turntable 31. When this descent occurs the player arm has been located in initial playing position for the record which is to be played.

When the underside of a record supported on the auxiliary turntable 34 is to be played the player arm 32 is moved inwardly at an intermediate position and it is biased upwardly to engage the underside of the record in its initial playing position. For this purpose I slidably mount on the upper side of the cam gear 37 a T-shaped member 121. This T-shaped member is biased radially inwardly by means of a spring 122 into a position where it clears the lever 117. Means, hereinafter to be described, are provided for projecting the T-shaped member 121 radially outwardly into a position where it cooperates with the lever 117 as shown in Figs. 13 and 14. When the cam gear rotates towards its position of rest to play the underside of a record the T-shaped member 121 is projected outwardly so that an arcuate surface 123 on the T-shaped member 121 engages the lever 117 and prevents it from riding down the cam fall 120. Consequently, the player arm moves inwardly at its intermediate position where it clears the stack of records on the turntable 31 and the record which is to be played on the auxiliary turntable 34. On the T-shaped member 121 is pivotally mounted at 124 a lever 125. The free end of the lever 125 is biased upwardly by a spring 126 carried between the lever 125 and the T-shaped member 121. A stop 127 carried by the T-shaped member 121 limits the upward movement of the lever 125. As the cam gear moves towards its normal position of rest the downturned free end of the lever 125 engages a cam 128 carried by the bracket 112 so as to depress the lever 125 against the upward pressure of the spring 126. Further movement of the cam gear towards its position of rest, which is illustrated in Fig. 14 brings the free end of the lever 125 into engagement with a cam shaped flange 129 depending from the lever 117 so that the lever 117 is gradually raised, the cam 128 becoming gradually ineffective. At the position of rest as shown in Fig. 14 the rod 114 has elevated the player arm so that it cooperates with the underside of the record on the auxiliary turntable 34. The weight of the player arm, the tension of the spring 109 and the upward pressure of the spring 126 are co-related so that the proper upward needle pressure is obtained.

To summarize the recent description, the vertical movements of the player arm when the underside of a record is to be played are controlled by the cooperation of the lever 117 with the elements on the T-shaped member 121 as illustrated in Figs. 13 and 14. When the upper side of a record is to be played the elements on the T-shaped member 121 are clear of the lever 117 so that the vertical movements of the tone arm are controlled by the cam fall 120 in cooperation with the lever 117.

It is to be noted that after playing the underside of a record the cam gear 37 again goes into operation, the lever 125 moves to the right as viewed in Fig. 14 clearing the lever 117 so that this lever is now engaged by the cam 118 which maintains the player arm at an intermediate position during its lateral withdrawal away from the record positions.

The cam gear 37 is mounted for free rotation on a shaft 130 by means of its hub 131 with the aid of spacers 132. The shaft 130 is supported by the base plate 30 and an arm 133 which extends from the housing 68. The cam gear is provided with a flange 134 and below the flange with a circumferential series of teeth 135. The teeth 135 mesh with a pinion 136 which is integral with a bevel gear 137. The pinion 136 and gear 137 are mounted for free rotation on the turntable spindle 38. The bevel gear 137 meshes with an idler 138 which also meshes with a bevel gear 139 mounted for free rotation on the spindle 38 and in spaced relation to the bevel gear 137. Between the gears 137 and 139 a collar 140 is rigidly secured to the turntable spindle 38. The collar 140 is provided with two series of ratchet teeth 141 and 142 which are spaced in the vertical direction so that the teeth 141 cooperate with a dog 143 pivotally mounted on the gear 137 and the teeth 142 cooperate with a similar dog 144 pivotally mounted on the gear 139. The dogs 143 and 144 are biased towards the teeth 141 and 142 by springs 145 connected to each dog and to the gear with which the dog is associated. It will readily be seen that when the dogs are allowed to engage their ratchet teeth the turntable spindle will drive the cam gear 37 in the same direction, that is the counterclockwise direction as viewed from above, irrespective of the direction of rotation of the turntable spindle 38. When the turntable spindle is rotating in the clockwise direction as viewed from above the collar 140 rotates in the same direction and one of the teeth 141 engages the dog 143 so that the gear 137 and the pinion 136 rotate in the clockwise direction driving the cam gear in the counterclockwise direction. At this time the gear 139 is driven in the counterclockwise direction from the gear 137 through the idler gear 138. The teeth 142 ratchet past the dog 144 when the turntable is being driven in the clockwise direction. When the turntable spindle 38 is being rotated in the counterclockwise direction as viewed from above the teeth 141 ratchet past the dog 143 but the teeth 142 drive the dog 144 in the counterclockwise direction. The gear 139 now drives the gear 137 in the clockwise direction through the idler 138 so that the cam gear 37 is again driven in the counterclockwise direction. Thus, the drive of the cam gear is always effected in the same direction irrespective of the direction of rotation of the motor 90. When a member 146 is biased towards the dogs 143 and 144 it enters between the tails of the dogs and when the dogs engage the member 146 the dogs are moved outwardly away from the teeth 141 and 142 so that the drive of the cam gear is terminated. When the member 146 is withdrawn from between the dogs 143 and 144 the dogs engage the teeth 141 and 142 with the result that the cam gear is driven in the counter-clockwise direction as explained above. As will hereinafter be explained the member 146 engages the dogs 143 and 144 during the playing of a record so that the cam gear 37 is stationary. At the end of the playing of a record the player arm trip which will hereinafter be described effects the withdrawal of the member 146 so that the cam gear 37 is driven through a complete revolution. At the end of this complete revolution the member 146 is again projected into cooperation with the dogs 143 and 144 so that the drive of the cam gear 37 is terminated. When this occurs a spring pressed dog 147 is in registry with a notch 148 in the flange 134 of the cam gear so that the cam gear is held stationary during the playing of a record.

Figure 11:
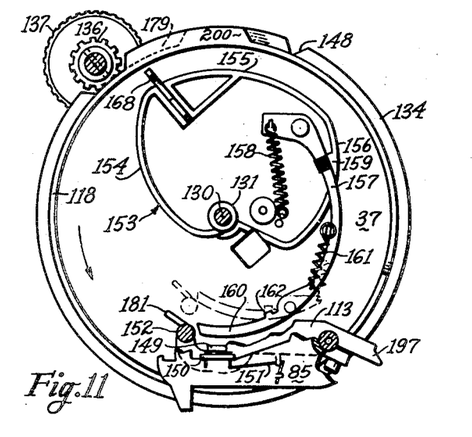
Fig. 11 is a top plan view of the main cam gear as it is approaching its position of rest.

The arm 113 which is rigidly mounted on the lower end of the sleeve 106 so as to move with the horizontal movements of the player arm, carries an upwardly projecting member 149 which registers with a flange 150 on the lever 85. A weak spring 151 mounted on the lever 85 is arranged to engage the member 149 of the arm 113 so as to bias the player arm inwardly with a slight force. The arm 113 carries a depending pin 152 which is arranged to engage a cam 153 on the upper side of the cam gear 37. The position of rest of the cam gear 37 is shown in Fig. 11 and it is to be noted that the arm 113 is free to move inwardly as the record is being played, the lever 85 being prevented from following it by its engagement with the abutment 84. The player arm actuates the trip at the end of the playing of the record at which time the pin 152 is at an inner position near the axis of the cam gear. The cam gear starts to rotate and the rise 154 on the cam 153 engages the pin 152 moving it outwardly. The member 149 engages the flange 150 as the player arm moves outwardly beyond initial playing position, carrying the lever 85 outwardly against the tension of its spring 88. The dwell 155 on the cam 153 holds the player arm out in its extreme position until the record has been dropped. Then the pin 152 moves inwardly over the fall 156 of the cam 153 towards initial playing position. In thus moving inwardly the pin 152 engages a lever 157 pivotally mounted on the cam gear biased outwardly by a spring 158. The strong spring 88 forces the pin 152 inwardly as this pin moves along the fall 156 until the lever 85 engages the abutment 84 and the player arm is returned to initial playing position. A shoulder 159 on the cam 153 serves as an abutment for the arcuate lever 157. An extension 160 is pivotally mounted on the lever 157 and is normally biased into its position in full lines in Fig. 11 by a spring 161. A stop 162 on the extension 160 is arranged to engage the lever 157 so as to define this position. The springs 158 and 161 are arranged so that the lever 157 and its extension 160 are biased outwardly with a force which is overcome by the spring 88 of the lever 85. This outward force is however sufficient to overcome the inward bias provided by the spring 151. Consequently, continued rotation of the cam gear clears the extension 160 from the pin 152 at a time when the player arm has been brought into engagement with the record in its initial playing position and the weak spring 151 then becomes effective to apply a gentle force to the player arm bringing its stylus into engagement with the groove of the record to be played.

Figures 6, 7, 8:
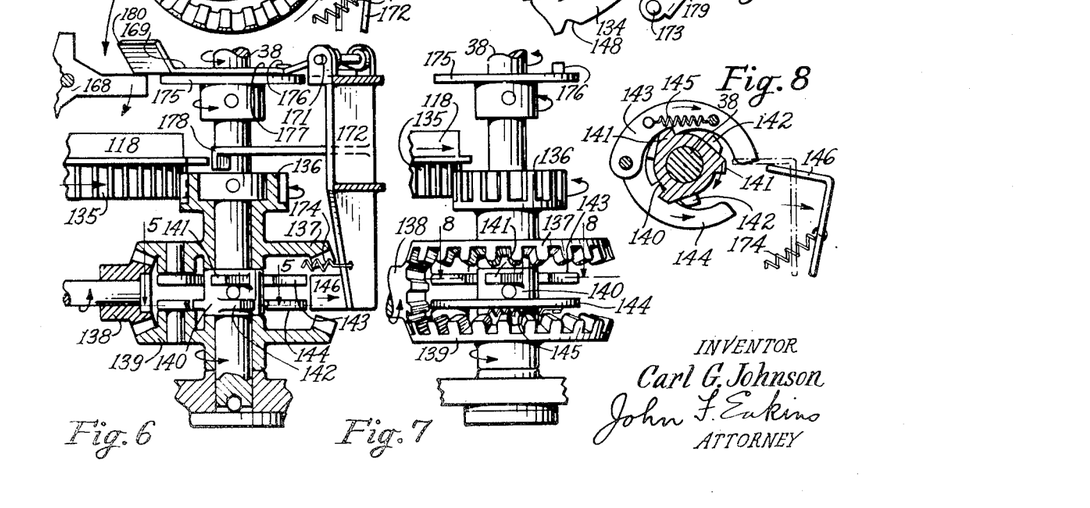
Fig. 6 is a vertical sectional detail view showing the drive elements of the main cam gear, the direction of rotation of these elements being indicated by arrows, the turntable spindle rotating in the counterclockwise direction.
Fig. 7 is an elevational view of the elements shown in Fig. 6, the direction of rotation of these elements when the turntable spindle is rotating in the clockwise direction being shown by arrows.
Fig. 8 is a sectional plan view taken on the line 8—8 of Fig. 7.

The arm 113 carries a serrated arcuate edge 163 which is adapted to engage a dog 164 pivotally mounted on a latch lever 165 which is pivotally mounted on the cam gear 37 at 166. The dog 164 is biased into its normal position by a spring 167. Normally the latch 165 engages a three-armed lever 168 which is pivotally mounted on the cam gear 37, maintaining this lever in its position of Fig. 4. As the player arm moves inwardly on the record the serrated edge 163 engages the dog 164 and moves past this dog. When the movement of the player arm is reversed owing to to the stylus moving into an eccentric terminal groove on the record, the serrated edge 163 sends the dog 164 and the lever 165 in the clockwise direction as viewed from above so that the lever 168 moves in the clockwise direction as viewed in Fig. 4 withdrawing one of its arms from the lever 169. The lever 165 is biased towards the lever 168 by a spring 170. The latching position is shown in Fig. 15. The lever 169 is pivotally mounted on a horizontal axis 171 on a frame 172 which is pivotally mounted on a vertical axis 173 on the housing 68. The frame 172 carries the member 146 and the frame is biased inwardly by a spring 174. The lever 169 partially overlies a disc 175 rigidly carried by the turntable spindle 38. When the lever 168 is unlatched to drop into its position in Fig. 6 the lever 169 rests on the disc 175. An eccentric pin 176 carried by the disc 175 engages the edge 177 and swings the lever 169 and the frame 172 about the axis 173 so that the member 146 is moved outwardly clear of the dogs 143 and 144 as shown in full lines in Fig. 8 thus starting the drive of the cam gear 37. An abutment 178 carried by the frame 172 is normally located in a recess 179 in the flange 134 of the cam gear 37. When the frame 172 is swung outwardly and the cam gear 37 starts to move the abutment 178 engages the flange 134 so that the member 146 is held out until near the end of the complete revolution of the cam gear 37. At that time the lever 168 has been returned to its normal latched position so that the lever 169 is elevated near the end of the complete revolution of the cam gear by engagement of its cam surface 180 with the arm of the lever 168 which projects to the right in Fig. 4. Consequently, when the abutment 178 drops into the recess 179 in the flange 134 the frame 172 is swung back to its normal position introducing the member 146 into its phantom position in Fig. 8 so that the dogs 143 and 144 are disconnected from the turntable spindle. The cam gear coasts into its arrested position shown in Fig. 15 with the spring pressed dog 147 in the notch 148 of the flange 134 of the cam gear 37. The lever 168 is reset by a cam 181 carried by the arm 113. The arm 113 is in its outermost position when the lever 168 is reset by the cam 181.

The arm 113 also carries an abutment 182 which is arranged to engage an abutment 183 carried by the latch 165 so that the latch is unlatched at the end of the playing of a record provided with a spiral terminal groove. The latch is also arranged to be actuated manually by an abutment 184 depending from a slide 185 which is slidably mounted on the underside of the base plate 30. The member 185 also carries a depending arm 186 which is adapted to engage the upstanding arm of the lever 168 so as to prevent the lever from moving into unlatched position. The member 185 is connected by a link 187 to a control bar 188 slidably mounted on the underside of the base plate 30. The bar 188 is actuated manually by a button 189 located on the upper side of the base plate 30.

The switch 91 is actuated by a lever 190 pivotally mounted at 191 on a bracket 192. The lever 190 carries a depending pin 193 which is located in a slot 194 in the bar 188. When the button 189 is in the "Off" position the pin 193 is located in a laterally offset portion 195 of the slot 194 and the switch is in the "Off" position. When the bar 188 is moved to any other position the switch 91 is in the "On" position and the motor 90 is operating.

When the button 189 is displaced from the "Off" position to the right the machine is conditioned for manual operation. The link 187 moves the slide 185 outwardly so that the abutment 186 engages the upstanding arm of the lever 168 so that this lever is not permitted to drop. Consequently, the cam gear 137 is maintained inoperative. When the slide 185 is in this condition a downturned flange 196 engages the latch member 89 so that the latch member now cooperates with the double beveled tip of an arm 197 carried by the arm 113. Consequently, the player arm is merely latched out when it is moved to its extreme outward position and it may be moved in manually against slight resistance. Means including a slider 198 are provided so that the lever 85 is locked in its outermost position when the player arm is moved outwardly into its outermost position after the bar 188 has been put in the manual position. These means are substantially similar to the means having this function described in my copending application referred to above.

Figure 12:
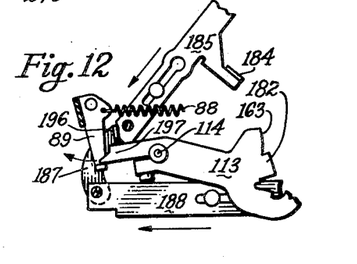
Fig. 12 is an inverted plan view showing the manner in which the player arm is locked out.

When the button 189 is moved from its normal "Off" position to the left as viewed in Fig. 1, the switch 91 is closed and the machine is conditioned for automatic playing. In this position the flange 196 is out of engagement with the latch member 89 so that the latch member engages the side of the arm 197 in the manner shown in Fig. 12 so that the player arm becomes locked out when it is moved outwardly automatically by the cam 153. The latch member 89 comprises an arm 199 which cooperates with a cam formation 200 on the upper side of the cam gear 37 above its flange 134. This cam formation overlies part of the recess 179 provided in the flange 134. The cam formation 200 is located so that it unlatches the latch member 89 when the cam follower 152 moves down the cam fall 156 on the cam 153 so that the player arm is moved inwardly by the conjoint action of the cam 153 and the lever 85.

Figures 18, 19, 20, 21, 22:
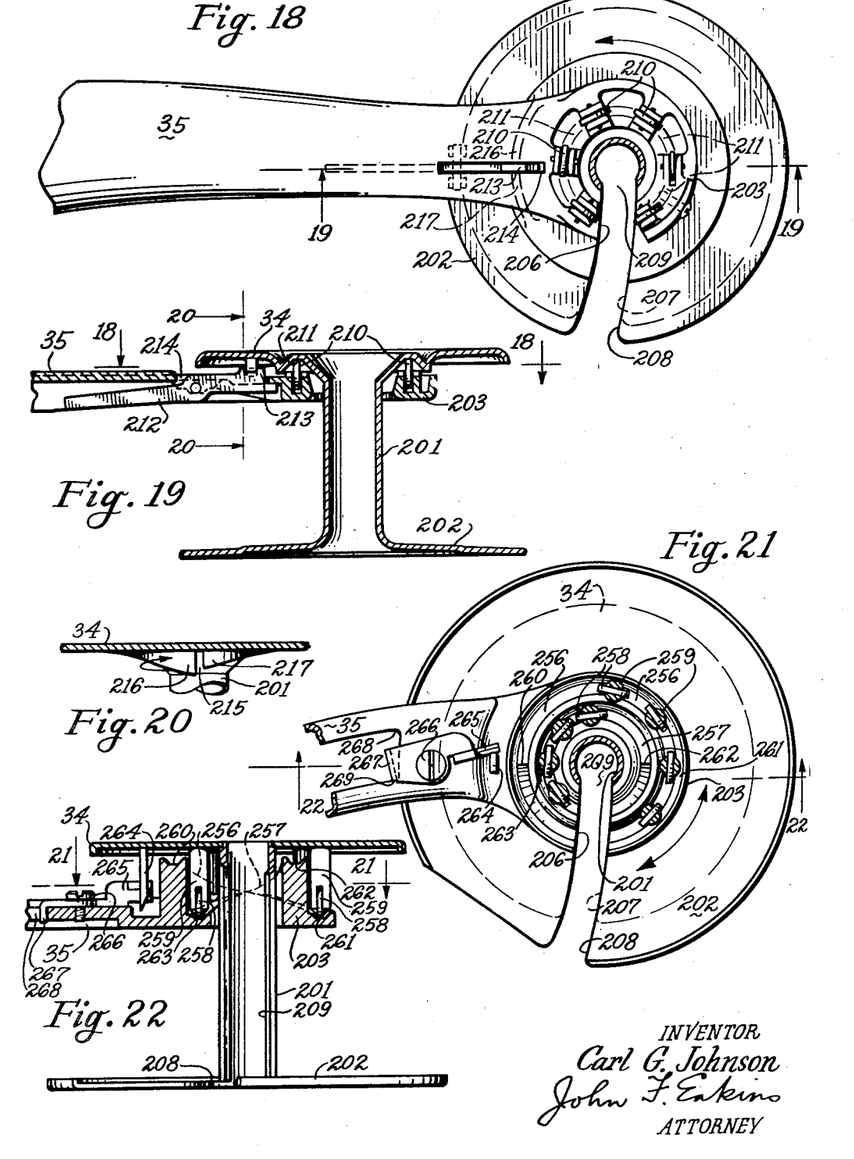
Fig. 18 is a fragmentary plan view of the arm which carries the auxiliary turntable, said turntable being cut away to disclose the mechanism therebeneath.
Fig. 19 is a sectional elevation taken on the line 19—19 of Fig. 18 showing the auxiliary turntable supported by its arm.
Fig. 20 is a fragmentary sectional view taken on the line 20—20 of Fig. 19 showing part of the auxiliary turnable and elements associated therewith.
Fig. 21 is a fragmentary plan view of a modification of the auxiliary turntable, the auxiliary turntable being cut away and being shown in phantom to disclose the mechanism associated therewith.
Fig. 22 is an elevational sectional view taken on the line 22—22 of Fig. 21 showing the manner in which the auxiliary turntable is supported on its arm.
Figure 23:
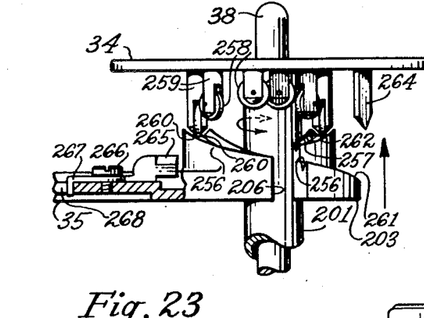
Fig. 23 is a fragmentary elevational view partly in section showing the manner in which the auxiliary turntable arm moves upwardly to engage elements associated with the auxiliary turntable.
Figure 24:
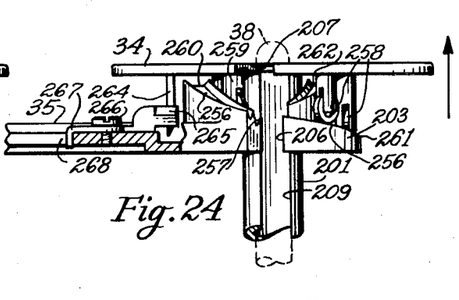
Fig. 24 is a view similar to Fig. 23 showing the manner in which the auxiliary turntable is supported on its arm when the arm is fully elevated.

In Figs. 1, 2, 4, 18, 19 and 20 I have shown one form of auxiliary turntable 34 and associated mechanisms. As best seen in Fig. 19 the auxiliary turntable comprises the upper flat portion of a spool shaped member. It is connected by a central tubular portion 201 to a flat disc 202 which is arranged to rest on the turntable or on a stack of records on the turntable. When the auxiliary turntable 34 is in playing position the turntable spindle 38 is accommodated within the tubular portion 201. The spoollike structure is arranged to be carried bodily by an arm 35, this arm being provided with a ring formation 203 at its end remote from the pivoted end of the arm. This ring formation is arranged to support and carry the spoollike structure which provides the auxiliary turntable 34 as shown in Fig. 19. The arm 35 is rigidly carried by a shaft 204 which is rigidly mounted in a standard 205 carried by base plate 30. This shaft is arranged for vertical and rotary movements. When a record is being played on the auxiliary turntable the shaft 204 is in its lowermost position so that the spoollike structure rests on the turntable or on a stack of records on the turntable with all parts of the arm 35 out of contact with it. At the end of the playing of a record on the auxiliary turntable the shaft 204 is elevated so that the ringlike structure 203 engages the underside of the auxiliary turntable 34 and lifts the spoollike structure off the turntable or off a stack of records which may have built up on the turntable. Then the arm 35 is moved laterally outwardly so as to bring the spoollike structure clear of the records allowing the record which has been played on the auxiliary turntable 34 to drop onto the turntable or the stack of records which may have built up thereon. The auxiliary turntable remains in this outward position until after the record dropped therefrom has been reproduced on the turntable 31. Thereafter the arm 35 moves inwardly in elevated position bringing the auxiliary turntable 34 into alignment with the turntable spindle 38 and then the arm 35 moves downwardly clear of the spoollike structure.

In order that the arm 35 and the spoollike structure may move into and out of co-axial relation to the turntable spindle 38 by lateral movement I provide in the ringlike structure 203 an arcuate slot 206. I also provide an arcuate slot 207 in the auxiliary turntable 34 and in the disc 202 a similar registering slot 208. A vertical slot 209 is provided in the tubular portion 201 which registers with the upper and lower slots 207 and 208. Means are provided for bringing the spoollike structure into a definite position shown in Figs. 2 and 18 with all the slots in register. When thus located the general arcuate slot is located so that the center of the shaft 204 is the center of the arc. It will readily be understood that when the spoollike structure is thus located on the arm 35 the arm may be moved in so that the spoollike structure is brought into co-axial relation with the turntable spindle 38, the spindle being located in the slot during the inward movement of the arm 35. Likewise, at the end of the playing of a record on the auxiliary turntable 34 the spoollike structure is thus located and the arm 35 may be moved outwardly, the spindle 38 being accommodated in the combined slot during the outward movement. The ringlike structure 203 is provided with a circumferential series of upwardly directed rollers 210. The rollers 210 are arranged to engage a circular track 211 provided on the underside of the auxiliary turntable 34. On each side of the track the metal forming the auxiliary turntable 34 is flared away from the track 211 so that the rollers 210 serve to position the spoollike structure in co-axial relation to the ring structure 203. On the underside of the arm 35 I pivot a latch member 212 so that a detent 213 on the latch member 212 is biased upwardly by gravity through a slot 214. The detent 213 is arranged so that it automatically enters a recess 215 provided between two fragmentary cylindrical ramps 216 and 217. The portion of the ramp 216 adjacent the recess 215 is longer than the adjacent portion of the ramp 217. When the arm 35 is raised after the playing of the underside of a record the turntable and spoollike structure are rotating in the counterclockwise direction as viewed from above. Consequently the detent 213 of the latch engages the longest part of the ramp 216 arresting the spoollike structure and continued upward movement of the arm 35 brings the detent 213 of the latch into the recess 215 thus positioning the spoollike structure so that its combined arcuate slot is related to the center of the axis of the shaft 204 as center. It is to be noted that the detent 213 of the latch 212 may first hit the sloping surface of the ramp 217. In this case the detent 213 is depressed until it arrives into register with the recess 215 whereupon it enters the recess. It will thus be seen that the spoollike structure is latched into its definite position relative to the arm 35 and when this arm again moves inwardly the combined slot is located to receive the turntable spindle as the spoollike structure is moved into alignment with that spindle. When that alignment has been attained the arm 35 moves downwardly so that the spoollike structure rests on the turntable 31 or on a stack of records built up on the turntable with the arm 35 clear of the spoollike structure.

The mechanism for effecting the movements of the arm 35 will now be described. A link 218 pivoted on a bracket on the frame 68 is pivotally connected to a sliding member 219. At the point of connection the link carries a cam follower 220 which follows the alternate cam tracks 221 and 222 on the underside of the cam gear 37. In Fig. 10 I have shown the elements 218 and 219 at an intermediate portion of a cycle occuring after the playing of a record on the auxiliary turntable 34. During this cycle the escapement heads 33 are not actuated and consequently the gate 71 diverted the cam follower 69 along the cam track 73 and the gate 71 was actuated for the next cycle of cam gear 37. The cam follower 220 had its initial position at the spot indicated by the reference number 223 in Fig. 10. A gate 224 diverted the cam follower 220 into the track 221 so that the sliding member 219 has been moved outwardly to almost its fullest extent. The cam follower 219 is about to enter a large dwell on the cam track 221. At the end of the rotation of the cam gear 37 the cam follower 219 is approximately in the position indicated by the reference member 225 on Fig. 10 so that the arm 35 is left in its outward position. During this cycle the player arm is operated to play the record which was last dropped on the turntable 31 by the withdrawal of the arm 35. The gate 224 is provided with an enlarged butt 226 which is shown in Fig. 10 as about to be engaged by the cam follower 220.

Upon the next cycle of the cam gear 37 the cam follower 220 moves inwardly towards the center of the cam gear 37 following the portion of the cam track 221 to the right of the position 225 and the cam track 222 into which it is diverted by the displaced gate 224. The cam gear 37 again comes to rest with the cam follower 220 in the position 223. In arriving at this position the cam follower 220 has again displaced the gate 226 into its position in Fig. 10 for the next cycle.

It may here be noted that the inner end of the T-shaped member 121 is offset and extends through an opening in the cam gear so that its butt 227 is located within the cam track 222 as best seen in Fig. 10. Consequently, as the cam follower moving through the cam track 222, approaches the position 223, the T-shaped member 121 is projected outwardly so that the player arm is elevated by the mechanism on the T-shaped member as shown in Fig. 14. The stationary position of the cam gear 37 when playing the underside of a record on the auxiliary turntable 34 is shown in Fig. 4 and at that time the cam follower 220 is located at the position 223, the T-shaped member 221 being directed towards the player arm pivot when the cam gear is at rest. The butt 227 of the T-shaped member 121 is of such dimension that it is engaged by the cam follower 220 over a substantial angle towards the end of a revolution of the cam gear 37 and in the initial part of the movement of the cam gear 37. Consequently, the T-shaped member is maintained in operative projected position for a sufficient length of time to insure the appropriate manipulation of the player arm. At the end of the cycle of the cam gear 37 as shown in Fig. 10 the cam follower 220 is in the position 225 and the T-shaped member 121 is not projected so that the vertical movements of the player arm are controlled by the cam fall 120 so that in this case the player arm moves downwardly to engage the upper side of a record on the turntable 31. The T-shaped member 121 is guided for radial movement by engagement of opening therein with the hub of the cam gear 37, by engagement of a slot 228 with a stud 229 on the upper side of the cam gear 37 and by means of a downward projection 230 which rides in a radial slot in the cam gear 37 as best seen in Fig. 14.

Figures 2, 3:
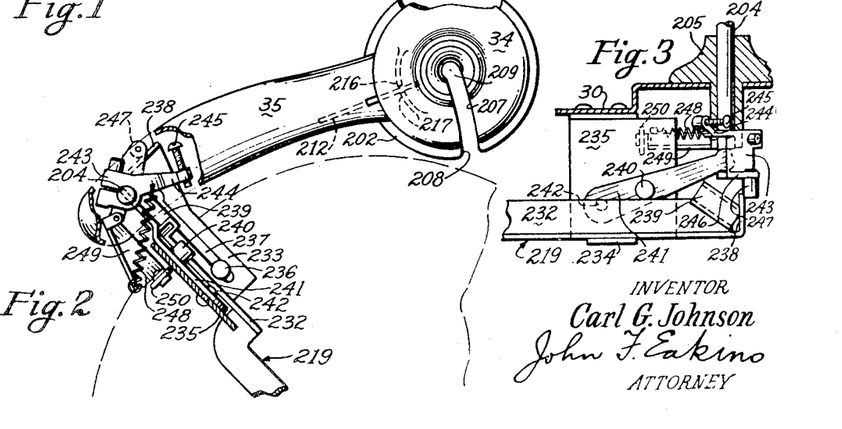
Fig. 2 is a fragmentary plan view, partly in section showing the auxiliary turntable and the arm which carries it clear of the record position for the playing of the topside of a record.
Fig. 3 is a fragmentary sectional elevational view showing the mechanism which actuates the arm which carries the auxiliary turntable to move them into the position shown in Fig. 2.

The sliding member 219 is bent at 231 (Fig. 4) to provide a vertical flange 232. The horizontal flange 233, integral with the flange 232 rests upon a bracket 234 which projects laterally from a plate 235 depending from the base plate 30. The flange 233 is guided by a stud 236 carried by the bracket 234 and extending through a longitudinal slot 237 as best seen in Fig. 10. The extremity of the flange 233 is bent upwardly to provide an abutment 238. The extremity of the flange 232 is bent three times to provide a cam track 239 which is inclined inwardly and upwardly. As best shown in Fig. 4 the cam track 239 begins at the position of the abutment 238 and terminates inwardly thereof. The inner end of the cam track has its underside running into the upper surface of the flange 232 as best seen in Fig. 4. When the sliding member 219 is in its innermost position, as viewed in Fig. 4, a cam follower 240 carried by a lever 241 which is pivotally mounted on the plate 235 at 242, is located in the lowermost part of the cam track 239. As the sliding member 219 is projected outwardly the cam follower 240 rides up the cam track 239 swinging the lever 241 upwardly. The extremity of this lever engages the lower end of the shaft 204 so that the arm 35 is raised to its highest position, the cam follower 240 rolling along the upper edge of the flange 232 during the latter part of the outward movement of the sliding member 219. The outermost position of the sliding member 219 is shown in Fig. 3. Rigidly secured to the lower end of the shaft 204 is a fitting 243 which comprises an arm 244 which carries a set screw 245. The fitting 243 also provides an arm 246 which carries a downwardly projecting member 247, which is arranged to cooperate with the abutment 238. The arm 35 is biased towards its inward position, that is, its position in which the auxiliary turntable 34 is in alignment with the turntable spindle, by means of a spring 248 which is connected to the arm 244 and to a member 249 on the other side of the plate 235. The member 249 is pivotally connected to the fitting 243 and is provided with a roller 250 which rides up and down on the plate 235 as the arm 35 is moved up and down. The set screw 245 engaging the plate 235 serves as a stop for the inward movement of the arm 35 and adjustment of the auxiliary turntable into coaxial relation with the spindle can be attained by adjusting the screw 245.

When the sliding member 219 is in its innermost position as shown in Fig. 4, the arm 35 is in its lowermost position and the spoollike structure which provides the auxiliary turntable 34 is in alignment with the turntable spindle 38. As the sliding member 219 is projected outwardly the cam follower 240 rides up the inclined cam track 239 raising the arm 35 upwardly so that it lifts the spoollike member and the record 36 resting thereon. This raises the fitting 243 so as to bring the abutment 247 into register with the flange 238. Continued outward movement of the sliding member 219 brings the flange 238 into engagement with the abutment 247 so that the arm 35 is swung outwardly in its elevated position, the cam follower 240 riding along the upper edge of the flange 232. Before the arm 35 is thus moved outwardly the spoollike structure has been brought into its definite position on the arm 35 so that the combined slot referred to above moves out clear of the turntable spindle 38. It will thus be understood that in one cycle of the cam gear 37, the cam follower 220 is initially at the position 223 (Fig. 10) on the cam gear and during the first half of the revolution the cam follower 220 moves through its position on Fig. 10 so that the sliding member 219 has been pushed outwardly moving the auxiliary turntable 34 clear of the record which has just been played thereon. This record drops onto the stack of records on the turntable 31. Continued rotation of the cam gear brings the cam follower 220 to approximately the position indicated at 225 on the cam gear 37 (Fig. 10) so that the arm 35 remains in its elevated and outward position while the upper surface of the record which dropped onto the turntable is played. On the next cycle of the cam gear 37 the cam follower 220 starting from the position 225 moves rapidly inwardly during approximately the first quarter of the revolution so that the sliding member 219 is moved in about half its travel bringing the abutment 238 away from the abutment 247 so that the spring 248 moves the arm 35 inwardly to the co-axial position of the auxiliary turntable 34 with the turntable spindle 38. The arm 35 is maintained elevated by the cam follower 240 riding on the upper edge of the flange 232. The cam follower 220 now rides around the dwell of approximately half a revolution provided by the cam track 222 so that the elevated and co-axial position of the auxiliary turntable 34 is maintained. After the arm 35 is moved inwardly the escapement heads 33 are actuated to drop a record by the cam follower 69 passing through the cam track 74. Consequently, the lowermost record of the stack supported on the escapement heads 33 drops onto the auxiliary turntable 34. Continued movement of the cam gear moves the sliding member 219 further inwardly so that the cam follower 240 runs down the cam track 239 bringing the arm 35 downwardly to its lowermost position so that the spoollike structure is caused to rest on the turntable 31 or on the stack of records which may have built up on the turntable.

The reversing switch 92 is best shown in Fig. 4. It comprises a pair of contacts 251 which are normally in engagement so that the turntable 31 is driven in the counterclockwise direction. When the other pair of contacts 252 are engaged the turntable 31 is driven in the opposite direction. Associated with the center pole of the switch is a flexible arm 253 which is biased upwardly as shown in Fig. 4. The arm 253 is connected to the movable pole of the switch by means of a horseshoe spring 254. The arrangement is such that when the arm 253 is free to move upwardly to its normal position the switch closes the contacts 251. Upon the lever 218 is carried a block of insulation 255. As the sliding member 219 approaches its most outward position the block 255 engages the arm 253 and depresses it so that the spring 254 snaps the switch so as to close the contacts 252 reversing the motor. The block 255 holds the switch in this condition until the next cycle of the cam gear 37 and when the arm 35 begins to move inwardly the block 255 clears the arm 253 so that the switch attains its normal position shown in Fig. 4 and the motor is again reversed.

It will thus be seen that the motor is reversed after each side of a record is played and before the beginning of the playing of the next side of a record.

The motor 90 may be any suitable kind of reversible motor such as a reversible shaded pole motor or a split phase motor, the direction of rotation depending upon which switch 251 or 252 is closed.

In Figs. 21, 22, 23, 24 and 25 I have shown a modification of the auxiliary turntable 34 and the spoollike structure which does, however, operate in the same general manner as the embodiment of these elements first described. In this modification the auxiliary turntable 34 is the upper disc of a spoollike structure which is supported by a base 202. The spoollike structure is supported by a ringlike structure 203 carried by the arm 35 The ringlike structure and the spoollike structure are provided with slots which are arranged to come into alignment to accommodate the turntable spindle 38 as the spoollike structure is brought into and out of co-axial relation with the turntable spindle. In this modification the spoollike structure is arranged to move into its definite position relative to the arm 35 by gravity. In this modification the ringlike structure 203 is provided with two concentric tracks 256 and 257 which are adapted to receive rollers 258 carried by two sets of pins 259, depending from the auxiliary turntable 34. Each track 256 and 257 is provided by two semicircular (in plan) helical segments so that the track 256 is provided with a peak 260 and a low point 261, and the track 257 is provided with a peak 262 and a low point 263. The peaks 260 and 262 are located diametrically oppositely; likewise the two low points 261 and 263. The pins 259 are graduated in length. Thus, the uppermost pin 259 shown in Fig. 21 is short. The next pin in the clockwise direction is of medium length. The next pin in the clockwise direction is long and the last pin in the clockwise direction is again of medium length. The pin 259 of the inside series of pins which is lowermost as viewed in Fig. 21 is of medium length. The next pin 259 in the clockwise direction is long. The next pin in the clockwise direction is of medium length and the last pin in the clockwise direction is short. The variation in length between adjacent pins corresponds to the slope of the tracks 256 and 257. The arrangement is such that when the arm 35 is elevated each of the tracks 256 and 257 engages at least two of the rollers 258 and as the upward movement of the arm 35 continues the spoollike structure rotates in one direction or the other, the engaged rollers riding down one side of each track until the rollers carried by the longest pins 259 rest on the lowermost points of the two tracks. In this position the slots on the spoollike structure register with the slot in the ringlike structure 203 and the general arcuate slot is located in arcuate relation to the center of the shaft 204 as center. The arrangement is such that three rollers of one series of pins 259 engage one track and two rollers of the other series of pins initially engages the other track. Since the locations of engagement are substantially diametrically opposite the auxiliary turn table 34 and the record carried thereby are maintained horizontal. If desired, I may provide two complete circumferential series of pins 259 but I find that this is not necessary if the two series are located generally in diametric opposition as shown in Fig. 21. I prefer to provide stop means to arrest the spoollike structure in its critical position and prevent any tendency of the spoollike structure from moving past this critical position due to inertia. I provide a stop 264 depending from the auxiliary turntable 34. This stop is adapted to engage a movable stop 265 when the spoollike structure reaches or approaches its critical position. The movable stop 265 is loosely mounted on the arm 35 by means of a screw 266 and it is provided with a tail 267 which is adapted to engage abutments 268 and 269 on the arm 35. The movement permitted to the movable stop 265 by the abutment 268 and 269 is sufficient to take care of the size of the depending stop 264. Thus, when the spoollike structure arrives at its critical position by a clockwise movement as viewed in Fig. 21 the stop 264 engages the stop 265 and brings the tail 267 into engagement with the abutment 269, whereby the spoollike structure is definitely arrested in its definite position. If the spoollike structure arrives at its critical position by a counterclockwise movement, as viewed in Fig. 21, the stop 264 engages the other side of the stop 265 and swings this stop so that its tail 267 engages the abutment 268 and again the spoollike structure is arrested in its definite position. It will, of course, be understood that when the arm 35 descends to place the spoollike structure on the turntable 31 or upon a stack of records carried by the turntable all the elements carried by the arm 35 are clear of all the elements carried by the spoollike structure, as is shown in Fig. 25.

The bar 188 is held in "Manual," "Off" and "Automatic" position by engagement of a spring pressed dog 270 with notches 271, 272 and 273 in the bar 188. Adjacent the notch 273 the bar 188 is formed to provide a cam 274. When the button 189 is moved to "Reject" position the dog 270 rides up the inclined surface of the cam 274 so that the bar 188 is moved back to "Automatic" position immediately the button 189 is manually released.

When the bar 188 is moved to "Manual" position the arm 186 on the slide 185 is moved to the left as viewed in Fig. 1 so that the three armed lever 168 is held elevated so that the cam gear 37 cannot be driven. For "Manual" playing, the bar 188 should be moved to "Manual" position when the arm 35 is out and the player arm is cooperating with a record on the turntable 31. After the machine is conditioned so that the player arm is biased upwardly, the bar 188 may be moved momentarily to "Reject" position so that the cam gear 37 is put into cycle so as to condition the machine for playing on the turntable 31, the arm 35 moving outwardly and the motor 90 drives the turntable 31 in the clockwise direction as viewed from above. The bar 188 is now moved to the "Manual" position and the machine can be used as a manual record player. When the player arm is moved outwardly manually the lever 85 is latched out so that the player arm is capable of movement either manually or by the grooves on the records. As previously described, location of the bar 188 in "Manual" position moves the latch member 89 outwardly so that it cooperates with the double beveled end of the arm 197. Consequently, during manual operation the latch member 89 serves merely as a latch member which applies only slight resistance to manual displacement of the player arm inwardly from its extreme outward position.

After the machine has played a stack of records on both sides the cam gear 37 executes a cycle which brings the player arm inwardly and upwardly and brings the arm 35 inwardly. The button 189 should be moved to "Reject" position so that the cam gear 37 executes another cycle bringing the arm 35 outwardly and the player arm inwardly and downwardly into engagement with the topside of the topmost record of the stack which has accumulated on the turntable 31 The button 189 is moved to the "Off" position. The player arm is moved outwardly manually so that it is locked out by the latch member 89. The escapement heads 33 are rotated manually clear of the records by manual actuation of the right hand escapement head shown in Fig. 25. The stack of records is now removed from the turntable 31 by lifting it upwardly and the escapement heads 33 are positioned, again by manual actuation of the right hand head shown in Fig. 25, for the next stack of records which it is desired to play. The new stack is then placed on the escapement heads 33 with the turntable spindle 38 extending upwardly through their central openings. The button 189 is then moved to "Reject" position and released so that the cam gear is put into operation with the result that the arm 35 moves inwardly and seats the spoollike structure on the turntable, the motor 90 now drives the turntable 31 in the counterclockwise direction as viewed from above. The escapement heads 33 operate so as to release the lowermost record onto the auxiliary turntable 34. The player arm is unlocked by the action of the cam 200 on the cam gear 37 so that the player arm moves inwardly under the joint control of the lever 85, the cam 153 and the lever 157. During this cycle the T-shaped member 121 is projected so that the player arm is moved upwardly to reproduce the underside of the record supported on the auxiliary turntable 34. After this side of the record has been played the cam gear 37 executes a cycle in which the escapement heads 33 are not actuated, the arm 35 is moved outwardly so that the record, the underside of which has just been played, drops onto the turntable. The player arm moves outwardly so that it does not interfere with the dropping record and then the player arm moves inwardly and downwardly to reproduce the topside of the record on the turntable 31. This operation continues indefinitely until the underside and then the topside of each record of the stack has been reproduced.

Although the invention has been described in connection with the specific details of the preferred embodiment thereof, it must be understood that such details are not intended to be limitative of the invention except in so far as set forth in the accompanying claims.

Having thus described my invention, I declare that what I claim is:

1. A phonograph comprising a turntable, a spindle projecting upwardly from said turntable, a rigid structure arranged to be located so as to rest on the turntable and on records supported thereon in co-axial relation to said spindle, said structure comprising an elevated auxiliary turntable of small size arranged to support a record in coaxial relation to said turntable and with the recording groove on its underside exposed, player arm means arranged to cooperate with the upper side of a record and arranged to cooperate with the underside of a record on said auxiliary turntable, means for driving the turntable in one direction when the player arm means is cooperating with one side of a record and for driving the turntable and auxiliary turntable in the opposite direction when the player arm means is cooperating with the underside of a record on the auxiliary turntable, a movable member for moving said structure clear of the record supported thereby, and means for maintaining the last mentioned record in coaxial relation to said turntable when the structure is thus removed whereby said record is freed to drop onto the turntable.

2. A phonograph comprising a turntable, a spindle projecting upwardly from said turntable, a rigid structure arranged to be located so as to rest on the turntable and on records supported thereon in co-axial relation to said spindle, said structure comprising an elevated auxiliary turntable of small size so that the recording groove on the underside of a record supported thereon is exposed, player arm means, means for causing said player arm means to cooperate alternately with the underside of a record on said auxiliary turntable and with the upper side of a record on said turntable, means for supplying a record to the auxiliary turntable in said co-axial position, a movable member for moving said rigid structure outwardly clear of the record supported thereon after the playing of the underside of a record on its auxiliary turntable, means for retaining said record in coaxial relation to said turntable when the structure is thus removed whereby said record drops onto the turntable, and means for moving said movable member to bring said rigid structure into co-axial position with the turntable, and means for driving the turntable in one direction during the playing of a record thereon and for driving the turntable and the auxiliary turntable in the opposite direction when a record is being played on the auxiliary turntable.

3. A phonograph comprising a turntable, a spindle projecting upwardly from said turntable, a rigid structure arranged to be located so as to rest on the turntable and on records supported thereon, a movable arm arranged to carry said rigid structure into co-axial relation to said spindle and laterally clear of records through whose central openings the spindle extends, said rigid structure and said arm being provided with slots alignable with the path of the spindle relative to the arm and rigid structure during their inward and outward movements, means on said structure and arm for arresting said structure on its arm to provide the alignment of said slots with said path, said structure comprising an elevated auxiliary turntable of small size so that the recording groove of a record supported thereon is exposed, player arm means arranged to cooperate with the upper side of a record on said turntable and the underside of a record on said auxiliary turntable, and means for driving the turntable in one direction when the player arm means is cooperating with a record thereon and for driving the turntable and auxiliary turntable in the opposite direction when the player arm means is cooperating with a record on the auxiliary turntable.

4. A phonograph comprising a turntable, a spindle projecting upwardly from the center of the turntable, a rigid structure arranged to be located so as to rest on the turntable and on records supported thereon, a movable arm arranged to carry said rigid structure into co-axial relation to said spindle and laterally clear of records through whose central openings the spindle extends, said rigid structure and said arm being provided with slots alignable with the path of the spindle relative to the arm and rigid structure during their inward and outward movements, means on said arm and structure for arresting said structure on its arm to provide the alignment of said slots with said path, said structure comprising an elevated auxiliary turntable of small size so that the recording groove of a record supported thereon is exposed, player arm means, means for causing said player arm means to cooperate alternately with the underside of a record on said auxiliary turntable and the upper side of a record on said turntable, means for supplying a record to the auxiliary turntable in said co-axial position, means for moving said rigid structure outwardly after the playing of a record on its auxiliary turntable, whereby said record drops onto the turntable and for moving said rigid structure into co-axial position after the playing of the upper side of said record, and means for driving the turntable in one direction during the playing of a record thereon and for driving the turntable and the auxiliary turntable in the opposite direction when a record is being played on the auxiliary turntable.

5. A phonograph comprising a rotatable table, a spindle extending upwardly therefrom, a rigid structure arranged to seat on said table and on records supported thereon to rotate therewith, said structure comprising a small elevated turntable arranged to support a record in alignment with said turntable and with the recording groove on its underside exposed, a player arm arranged to cooperate with said underside, means for rotating said table and said auxiliary turntable in appropriate direction for reproduction of said underside by said player arm, means for moving said structure laterally clear of the played record, and means for retaining said record in alignment with said table whereby said record is freed to drop onto said table.

6. A phonograph comprising a rotatable table, a spindle extending upwardly therefrom, a rigid structure arranged to seat on said table and on records supported thereon to rotate therewith, said structure comprising a small elevated turntable arranged to support a record with the recording groove on its underside exposed, a player arm arranged to cooperate with said underside, an arm arranged to support said rigid structure and carry it into co-axial relation to said spindle and clear of a record which has been played on its turntable, whereby the played record drops onto the table, said arm and structure being provided with slots alignable with the path of the spindle relative to the structure during their inward and outward movements, means on said structure and arm for arresting said structure on said arm with said slots aligned with said path, and means for driving said table and auxiliary turntable in appropriate direction for reproduction of said underside by said player arm.

7. A phonograph comprising a rotatable table, a spindle extending upwardly therefrom, a rigid structure arranged to seat on said table and on records supported thereon to rotate therewith, said structure comprising a small elevated turntable arranged to support a record with the recording groove on its underside exposed, escapement means arranged to support a stack of records above said turntable with the spindle extending through their central openings, means for actuating said escapement means to release the lowermost record of the stack to drop onto the auxiliary turntable, a player arm arranged to cooperate with said underside, means for rotating said table and said auxiliary turntable in appropriate direction for reproduction of said underside by said player arm, and means for moving said structure laterally clear of the played record, whereby said record is retained by said spindle and freed to drop onto said table.

8. A phonograph comprising a rotatable table, a spindle extending upwardly therefrom, a rigid structure arranged to seat on said table and on records supported thereon to rotate therewith, said structure comprising a small elevated turntable arranged to support a record with the recording groove of its underside exposed, escapement means arranged to support a stack of records with the spindle extending through their central openings, means for actuating said escapement means to release the lowermost record of the stack to drop onto the auxiliary turntable, a player arm arranged to cooperate with said underside, an arm arranged to support said rigid structure and carry it inwardly into co-axial relation to said spindle and outwardly clear of a record which has been played on its turntable whereby the played record drops onto the turntable, said arm and structure being provided with slots alignable with the path of the spindle relative to the structure during their inward and outward movements, means on said arm and said structure for arresting said structure on said arm with said slots aligned with said path, and means for driving said table and auxiliary turntable in appropriate direction for reproduction of said underside by said player arm.

9. A phonograph comprising a turntable, a spindle extending upwardly therefrom, a structure arranged to sit on said turntable and on records carried thereby, in substantially co-axial relation to said spindle, said structure providing a small elevated auxiliary turntable arranged to support a record centered by said spindle with the recording groove on its underside exposed, player arm means arranged to cooperate with the underside of a record on said auxiliary turntable or the upper side of a record on the turntable, an arm arranged to engage and support said structure, means including a record dropping escapement arranged to support a stack of records above said turntable, reversible means for driving said turntable in either direction, record changing mechanism, trip means controlled by said player arm means to initiate a cycle of operation of said record changing mechanism at the end of the reproduction of a cycle, automatic means for varying each alternate cycle, said mechanism being arranged in one cycle to move the player arm means up and out, to move the arm in to bring the structure into co-axial alignment with the turntable and down to separate the arm from the structure so that it may rest freely on the turntable to rotate therewith, to actuate the escapement means to drop a record onto the auxiliary turntable, to bring the player arm means into initial playing position and up to engage the underside of the dropped record, and to reverse said reversible means and in the next cycle to elevate the arm to raise the structure and move it outwardly to allow the played record to drop onto the turntable, move the player arm means outwardly to permit said record to drop and then inwardly to initial playing position and then downwardly to engage the upper surface of the dropped record and to reverse said reversible means.

10. In an automatic phonograph, in combination, a turntable, a spindle extending upwardly therefrom, a rigid structure arranged to seat freely on said turntable in generally co-axial relation to said spindle, said structure providing an elevated small turntable, an arm arranged to support and transport said structure laterally into and out of said co-axial relation, means for elevating said arm to engage said structure in said co-axial position to raise it from its seated condition, means for moving said arm outwardly to clear the position of records on said turntable, means for moving said arm inwardly to carry said structure into said co-axial position and then downwardly to disengage said arm from said structure and allow the structure to become seated.

11. In an automatic phonograph, in combination, a turntable, a spindle extending upwardly therefrom, a rigid structure arranged to seat freely on said turntable in generally co-axial relation to said spindle, said structure providing an elevated small turntable, an arm arranged to support and transport said structure laterally into and out of said co-axial relation, means for elevating said arm to engage said structure in said co-axial position to raise it from its seated condition, means on said arm and said structure for arresting said structure in a definite position on said arm, means for moving said arm outwardly to clear the position of records on said turntable, means for moving said arm inwardly to carry said structure into said co-axial position and then downwardly to disengage said arm from said structure and allow the structure to become seated, said structure and said arm being provided with slots which register in said definite position and which provide an open path for the spindle during the inward and outward movements of said arm.

12. In an automatic phonograph, in combination, a turntable, a spindle extending upwardly therefrom, a rigid structure arranged to seat freely on said turntable in generally co-axial relation to said spindle, said structure providing an elevated small turntable, an arm arranged to support and transport said structure laterally into and out of said co-axial relation, means for elevating said arm to engage said structure in said co-axial position to raise it from its seated condition, means for rotating said turntable, co-operating latch means on said arm and structure arranged to engage as the structure rotates and the arm rises to arrest said structure in a definite position on said arm, means for moving said arm outwardly to clear the position of records on said turntable, means for moving said arm inwardly to carry said structure into said co-axial position and then downwardly to disengage said arm from said structure and allow the structure to become seated, said structure and said arm being provided with slots which register in said definite position and which provide an open path for the spindle during the inward and outward movements of said arm.

13. In an automatic phonograph, in combination, a turntable, a spindle extending upwardly therefrom, a rigid structure arranged to seat freely on said turntable in generally co-axial relation to said spindle, said structure providing an elevated small turntable, an arm arranged to support and transport said structure laterally into and out of said co-axial relation, means for elevating said arm to engage said structure in said co-axial position to raise it from its seated condition, cooperating cam elements on said arm and structure whereby the structure moves to a definite position on said arm by gravity as the arm lifts the structure, means for moving said arm outwardly to clear the position of records on said turntable, means for moving said arm inwardly to carry said structure into said co-axial position and then downwardly to disengage said arm from said structure and allow the structure to become seated, said structure and said arm being provided with slots which register in said definite position and which provide an open path for the spindle during the inward and outward movements of said arm.

14. In an automatic phonograph, in combination, a rigid structure comprising a base and an upper surface adapted to serve as a record support, an arm arranged to elevate and support said structure comprising a ringlike portion, complementary supporting means on said ringlike portion and on said structure arranged to center the structure on the ringlike portion when the arm is raised, said arm being arranged to move clear of the structure by downward movement after the base is seated, and complementary latch means on said arm and structure arranged to be brought into engagement to arrest the structure in a definite position on said arm when the arm is raised while the structure is being rotated.

15. In an automatic phonograph, in combination, a rigid structure comprising a base and an upper surface adapted to serve as a record support, an arm arranged to elevate and support said structure comprising a ringlike portion, said arm being capable of being disengaged from said structure by downward movement, means on said structure and on said ringlike structure arranged to engage when the arm is raised, last said means comprising inclined surfaces and members to engage them, whereby the structure is brought to a definite position relative to the arm by gravity as the arm is raised.

16. In an automatic phonograph, in combination, a rigid structure comprising a base and an upper surface adapted to serve as a record support, an arm arranged to elevate and support said structure comprising a ringlike portion, said arm being capable of being disengaged from said structure by downward movement, means on said structure and on said ringlike structure arranged to engage when the arm is raised, comprising two pairs of cams concentric in plan, arranged to cooperate during upward movement of the arm so that the structure is rotated by gravity into a definite position relative to the arm as the low points on the upper set of cams move down to the lowest points on the lower set of cams.

17. In an automatic phonograph, in combination, a rigid structure comprising a base and an upper surface adapted to serve as a record support, an arm arranged to elevate and support said structure comprising a ringlike portion said arm being capable of being disengaged from said structure by downward movement, a pair of cams concentric in plan on said ring-shaped portion having diametrically opposed high and low points, said high points being diametrically opposed and said low points being diametrically opposed, and a pair of complementary cam means on the upper structure each adapted to cooperate with a corresponding cam on the ring-shaped structure, whereby upward movement of the arm brings the cam means of the structure into contact with the cams on the arm, whereby the structure is rotated into a definite position on the arm as the low points of the cams move into engagement.

CARL G. JOHNSON.

REFERENCES CITED

The following references are of record in the file of this patent:

UNITED STATES PATENTS

| Number | Name | Date |
| --- | --- | --- |
| 2,230,003 | Mitchell | Jan. 28, 1941 |
| 2,318,654 | Wissner | May 11, 1943 |

FOREIGN PATENTS

| Number | Country | Date |
| --- | --- | --- |
| 111,499 | Sweden | June 15, 1944 |
| 111,950 | Sweden | July 27, 1944 |